J. H. LEE & C. P. VITITOE.
PLANTER.
APPLICATION FILED SEPT. 10, 1908.
924,911.
Patented June 15, 1909.
2 SHEETS—SHEET 1.
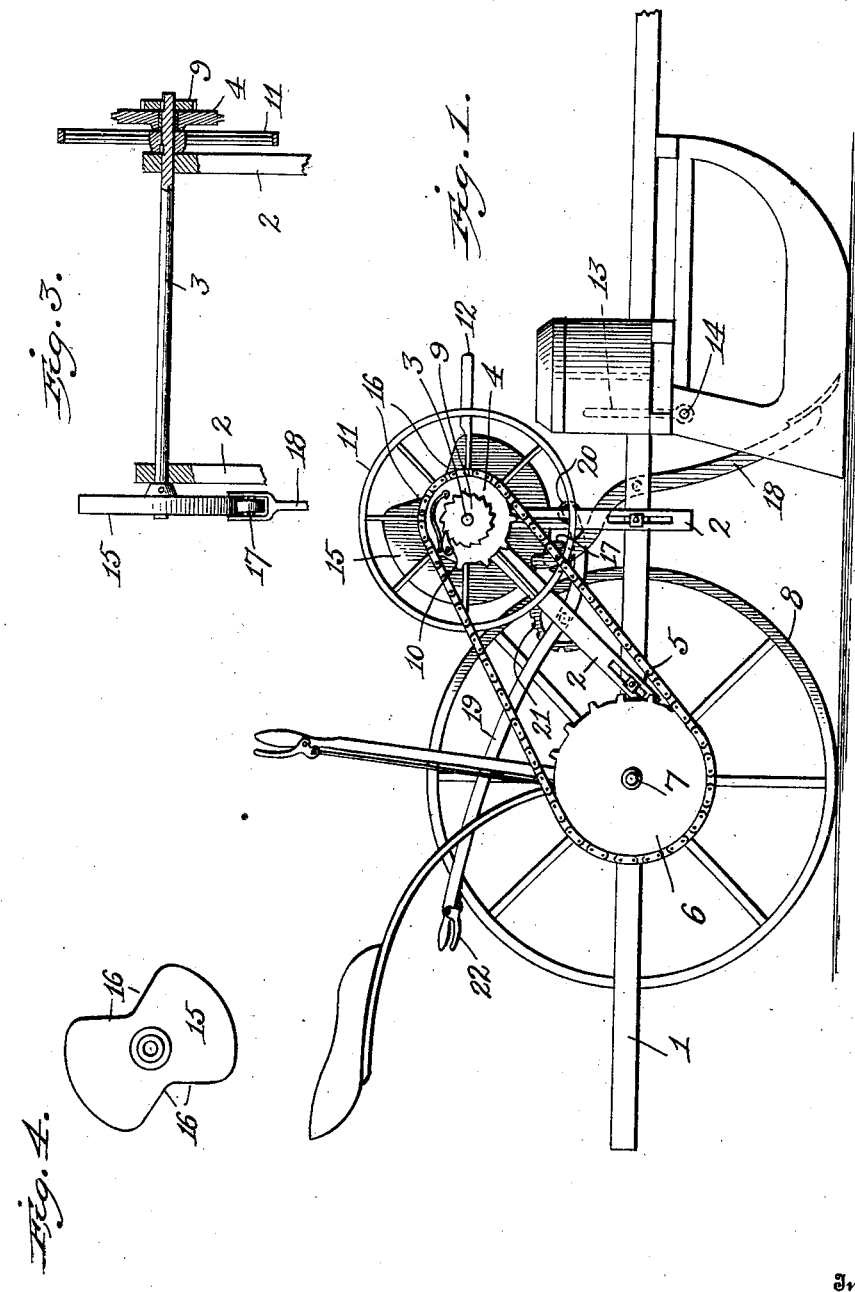

J. H. LEE & C. P. VITITOE.
PLANTER.
APPLICATION FILED SEPT. 10, 1908.
924,911.
Patented June 15, 1909.
2 SHEETS—SHEET 2.
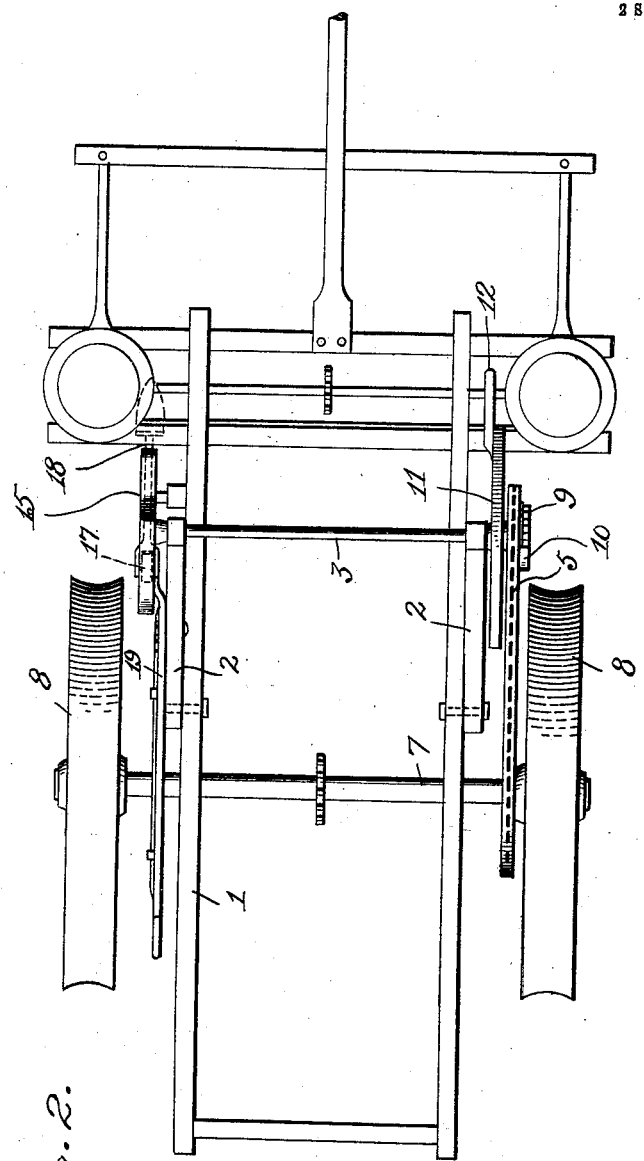

UNITED STATES PATENT OFFICE.

JOHN HAYS LEE AND CHARLES PARIS VITITOE, OF ROME, INDIANA.

PLANTER.

No. 924,911.     Specification of Letters Patent.     Patented June 15, 1909.

Application filed September 10, 1908. Serial No. 452,481.

*To all whom it may concern:*

Be it known that we, JOHN H. LEE and CHARLES P. VITITOE, citizens of the United States, and residents of Rome, in the county of Perry and State of Indiana, have invented certain new and useful Improvements in Planters, of which the following is a specification.

The invention relates to improvements in that class of planters which are employed in planting seed in parallel rows of hills, and more particularly to the means for marking the hills of a completed row so that the operator will know where to commence the next row.

It consists in the novel construction, combination and arrangement of parts hereinafter described, pointed out in the appended claims and illustrated in the accompanying drawings.

In the drawings, in which similar reference characters designate corresponding parts, Figure 1 is a side elevation of a planter embodying the invention. Fig. 2 is a plan view of the same. Fig. 3 is a detail sectional view of part of the mechanism for operating the marker. Fig. 4 is a detail view showing a modification of the sector-wheel.

The seed dropping and planting mechanism is of the usual construction, consequently no particular description of the same is required.

On opposite sides of the main frame 1 are adjustably mounted the supports 2 having journaled in their upper ends the transverse shaft 3. On one end of this shaft is journaled the sprocket-wheel 4 engaging the chain 5 leading from the sprocket-wheel 6 fast on the main driving shaft or axle 7. The latter is rotated by the traction-wheels 8 on its ends and motion is transmitted through the chain to rotate the wheel 4. Fast on the shaft 3 adjacent to the wheel 4 is the ratchet-wheel 9. With the latter engages the spring-pressed pawl 10 so that when the machine moves forward the shaft 3 is rotated, but when the machine moves backward the shaft remains at rest. Fast on the shaft 3 adjacent to the sprocket-wheel 4 is the wheel 11 carrying the trip 12 to engage the dog 13 on the shaft 14 of the seed-dropping mechanism. On the other end of the shaft 3 is the sector-wheel 15 fast thereon. A segment, as at 16, of this wheel is cut away to form a cam. On the periphery of the sector-wheel rides the roll 17 at the upper end of the marker 18 pivoted to the frame 1. As the sector-wheel rotates, through the rotation of the shaft 3, the roll 17 traveling on its periphery enters the recess 16 and permits the lower end of the marker to drop and dig the ground. The recess 16 is so located in the sector-wheel as to register with the roll 17 at the same time that the trip 12 engages the dog 13 to drop the seed, thereby operating the marker simultaneously with the dropping of the seed. A lever 19 is pivoted to the support 2 and at its inner end is the roll 20 to engage the upper end of the marker. By raising the upper end of the lever the marker is elevated clear of the ground and is held free from the sector-wheel in an inoperative position. By means of the rack 21 and the pawl operated by the hand-lever 22 at the outer end of the lever 19 the latter can be secured in its adjustments. In its operation the marker is released from the lever 19 as the machine approaches the end of a row to mark a few of the hills to indicate to the driver where to start the machine on the next row.

In Fig. 4 is shown a modified form of the sector-wheel 15. In this instance there are two recesses 16 instead of one as in the first instance. This permits a more rapid operation of the marker. There may be additional recesses to meet different requirements.

Having thus described our invention, what we claim and desire to secure by Letters Patent is,

1. In a planter, a main frame, supports adjustably mounted on opposite sides of said main frame, a driven shaft journaled in said supports, a main driving shaft journaled to said main frame, a sprocket-wheel fast on said driving shaft, a sprocket-wheel journaled on said driven shaft, a sprocket-chain connecting said sprocket-wheels, a ratchet-wheel fast on said driven shaft, a pawl on said sprocket-wheel on the driven shaft engaging said ratchet-wheel, a sector-wheel on said driven shaft, a marker pivoted to said main frame oscillated by said sector-wheel, and a lever pivoted to one of said adjustable supports to engage said marker to hold the latter out of contact with said sector-wheel in an elevated position.

2. In a planter, a main frame, supports adjustably mounted on opposite sides of said main frame, a driven shaft journaled in said supports, a main driving shaft journaled to said main frame, a sprocket-wheel fast on said driving shaft, a sprocket-wheel journaled on said driven shaft, a sprocket-chain connecting said sprocket-wheels, a ratchet-wheel fast on said driven shaft, a pawl on said sprocket-wheel on the driven shaft engaging said ratchet-wheel, a sector-wheel on said driven shaft, a marker pivoted to said main frame oscillated by said sector-wheel, a lever pivoted to one of said adjustable supports to engage said marker to hold the latter out of contact with said sector-wheel in an elevated position, a wheel fast on said driven shaft, and a trip on the last mentioned wheel for operating the seed-dropping mechanism.

In testimony whereof we hereunto affix our signatures in the presence of two witnesses.

JOHN HAYS LEE.
CHARLES PARIS VITITOE.

Witnesses:
  CHARLES KETCHAM,
  CLAUD ACKARMAN.